April 14, 1925.  
W. R. BENJAMIN  
FOOT PROPELLED VEHICLE  
Filed April 23, 1923  
1,533,824  
2 Sheets-Sheet 1
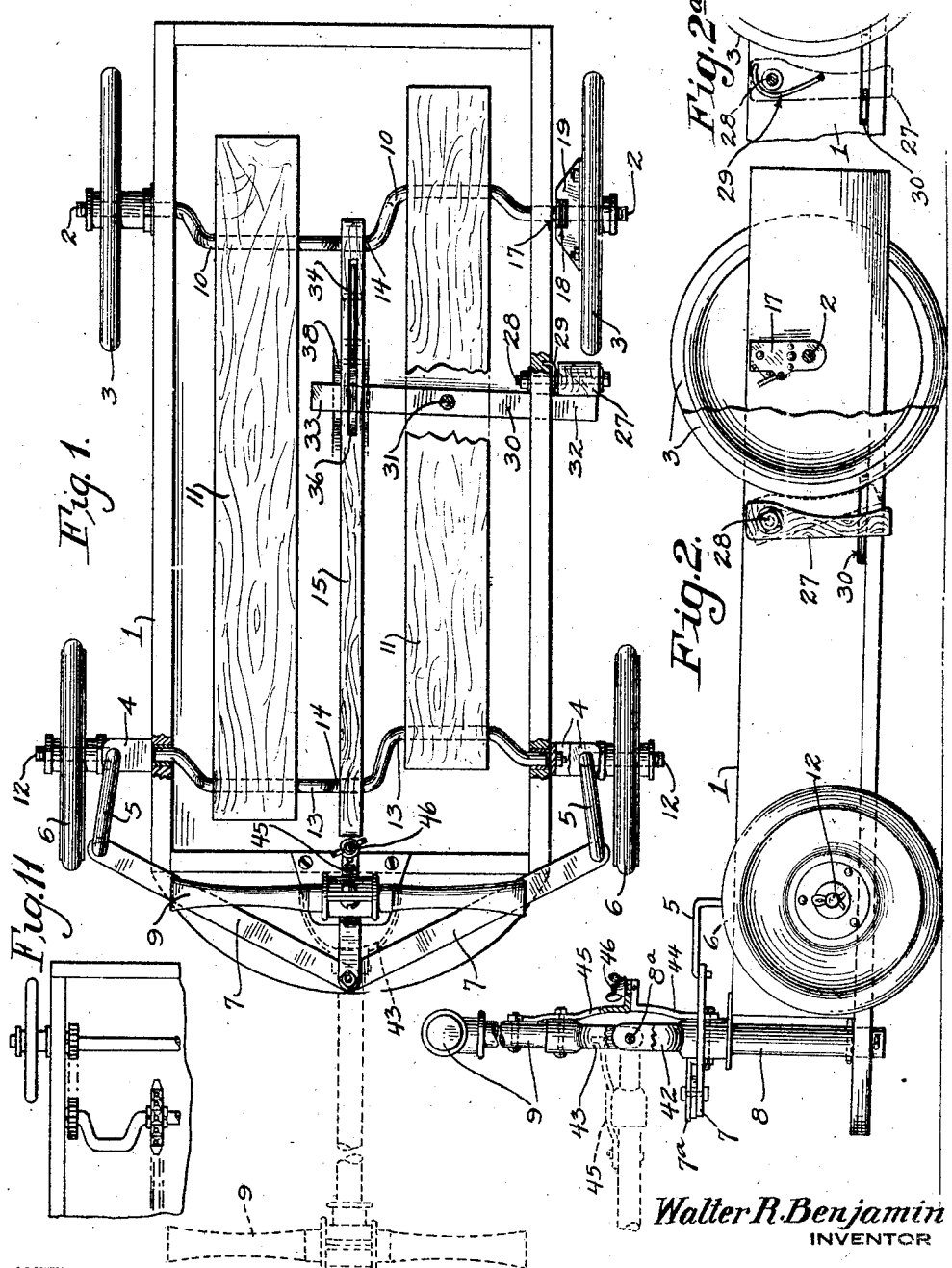
Walter R. Benjamin  
INVENTOR
WITNESSES April 14, 1925.
W. R. BENJAMIN
FOOT PROPELLED VEHICLE
Filed April 23, 1923    2 Sheets-Sheet 2
1,533,824
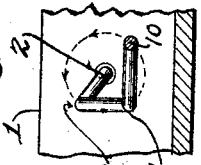
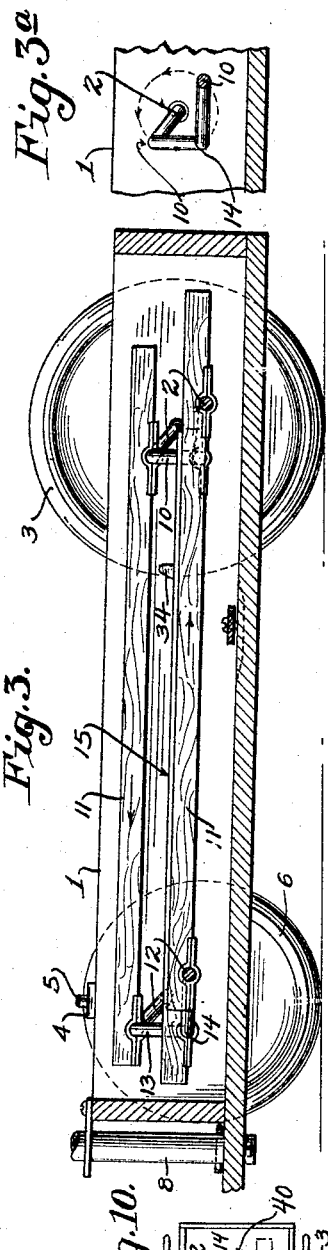
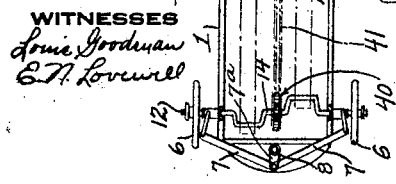
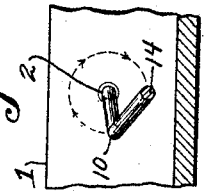
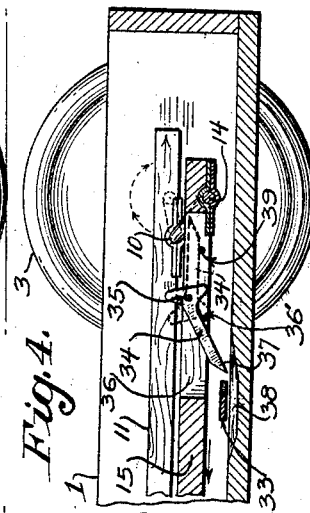
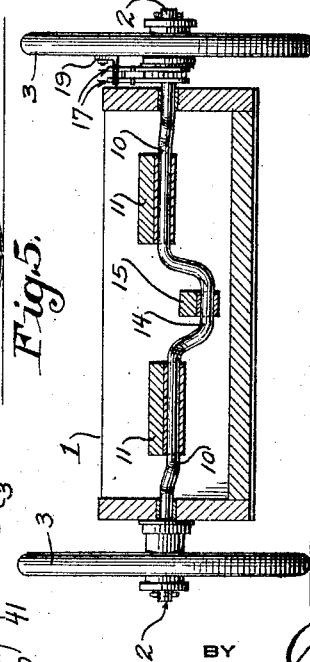
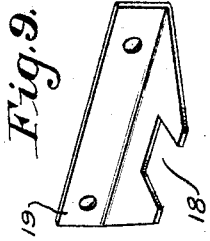
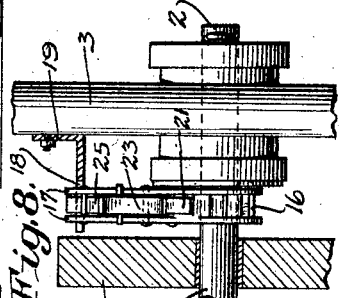
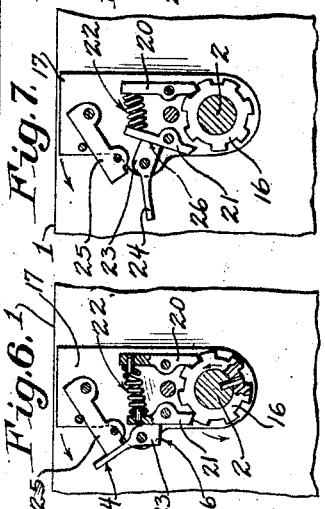
Walter R. Benjamin
INVENTOR
ATTORNEY Patented Apr. 14, 1925.

1,533,824

UNITED STATES PATENT OFFICE.

WALTER ROGERS BENJAMIN, OF GRANITE CITY, ILLINOIS.

FOOT-PROPELLED VEHICLE.

Application filed April 23, 1923. Serial No. 634,033.

*To all whom it may concern:*

Be it known that I, WALTER R. BENJAMIN, a citizen of the United States, residing at Granite City, in the county of Madison and State of Illinois, have invented new and useful Improvements in Foot-Propelled Vehicles, of which the following is a specification.

This invention relates to a foot-propelled child's vehicle and is especially adapted to be used in connection with a toy express wagon having front and rear wheels, a guiding tongue and a body which may be used for hauling loads, if desired.

One of the objects of the invention is to provide a vehicle with pedals on which a child may stand while operating the same to propel the vehicle, and which may be rendered inoperative when coasting or when using the vehicle for hauling.

Another important object is to provide novel and improved means whereby the pedals may be operated forwardly to propel the vehicle, and backwardly to apply a brake to the same. Means are also preferably provided whereby the pedals may be also used to propel the vehicle backwardly, if desired.

Still another object of the invention is to provide a pair of pedals supported on similar cranks at the front and rear, in combination with means connected with the crank shafts to hold them in the same position relatively to each other, making it impossible for one of the crank shafts to rotate in an opposite direction when the pedals are passing dead center.

With the above and other objects in view, which will be more fully understood as the description proceeds, the invention consists in certain details of construction and combinations of parts which will be fully described in connection with the accompanying drawings and subsequently claimed.

In the drawings:—

Fig. 1 is a plan view of a toy express wagon equipped with my invention, parts being broken away and shown in section to illustrate the construction more clearly.

Fig. 2 is a side elevation of the same with parts shown in section.

Fig. 2ª is a detail view of the brake-controlling mechanism.

Fig. 3 is a longitudinal sectional view of the invention.

Fig. 3ª is a detail view of the driving axle as shown in Fig. 3.

Fig. 4 is a longitudinal sectional view illustrating the actuation of the brake by back pedaling.

Fig. 4ª is a detail view of the driving axle as shown in Fig. 4.

Fig. 5 is a cross sectional view looking rearwardly from the driving axle.

Fig. 6 is a detail view of the ratchet connection between the driving axle and one of the rear wheels, showing the same locked.

Fig. 7 is a detail view of the same released to permit coasting.

Fig. 8 is a front elevation of the ratchet connection.

Fig. 9 is a detail perspective view of a keeper for locking the ratchet to one of the wheels to rotate therewith.

Fig. 10 is a plan view showing a modified form of connection for maintaining the crank shafts in the same relative position.

Figure 11 is a further modification along the line of that shown in Fig. 10.

As shown in the drawings, the vehicle comprises a body 1 having a rear transverse driving axle 2 journaled in the sides thereof and secured to the rear wheels 3. The body is provided at the front end with brackets 4 having steering knuckles 5 mounted therein on which are journaled the front wheels 6.

The upper ends of the steering knuckles 5 project forwardly and are pivotally connected to the rear ends of links 7, and the forward ends of these links are pivotally connected to the front end of arm on 7ª, which is secured to a vertical steering column 8, pivotally mounted at the front end of the wagon. A combined steering handle and tongue 9 is pivotally connected to the upper end of the steering column, as indicated at 8ª.

The rear or driving axle 2 is provided with two oppositely-disposed cranks 10, on which the rear ends of the pedals 11 are journaled. A similar crank shaft 12 is journaled in the side of the wagon body 1 near its forward end and provided with oppositely-disposed cranks 13 on which the forward ends of the pedals 11 are journaled. The cranks 13 are arranged parallel to and at equal distances from the respective cranks 10 and are held in the same relative position thereto so that the pedals 11 are always supported parallel to the ground.

In order to maintain the cranks 10 and 13 always in the same relative position and to positively prevent one of the crank shafts from rotating in the opposite direction when the pedals pass dead center, each of the shafts 2 and 12, as shown in Figs. 1 to 5, inclusive, is provided with an intermediate crank portion 14 disposed at an oblique angle to the cranks 10 and 13, respectively, and held always at the same distance apart by a connecting rod 15.

The wheels 3 are rotatably mounted on the crank shaft 2, while the latter has a ratchet wheel 16 secured thereto and adapted to be engaged by ratchet mechanism mounted between plates 17 which are journaled on the axle 2 and held in the slot 18 formed in a keeper 19 secured to the side of one of the wheels 3. The ratchet mechanism, which is shown in detail in Figs. 6, 7 and 8, includes a pair of opposed pawls 20 and 21, each pivoted between the plates 17 and normally urged into engagement with the teeth of the ratchet wheel 16 by a coiled spring 22. In the position shown in Fig. 6, both pawls are in engagement with the ratchet wheel and upon a forward movement of the pedals, the pawl 20 serves to drive the vehicle forwardly, while upon a reverse movement of the pedals, the pawl 21 serves to drive the vehicle rearwardly. In this position of the ratchet mechanism, the pawl 21 rests against the side of a pivoted cam member 23 that is provided with a finger 24 resting against an abutment 25 secured between the plates 17. Upon moving the finger 24 forwardly, the pawl 21 may be released from the ratchet wheel 16 and locked in that position by engagement with the flat face 26 of the cam, as shown in Fig. 7. In this position, the pawl 20 is operative when the vehicle is being propelled forwardly, but the pawl 21 is inoperative to permit the vehicle to coast when the pedals remain motionless.

Provision may also be made for applying a brake to one or both of the rear wheels when the pedals are moved backwardly. A convenient form of brake to be used for this purpose is shown at 27 in Figs. 2 and 2ª, the same being pivoted at its upper end to the side of the body, at 28, and adapted to be swung rearwardly about its pivot to engage the wheel tread, but normally held away from the same by a spring 29. A lever 30, pivoted centrally at 31 to the bottom of the body, extends at one end in front of the brake 27, as shown at 32, and means are provided at the other end 33, for rocking the lever to bring the brake into contact with the wheel tread. This means, as shown in Figs. 1 and 4, includes a dog 34 pivoted at 35 within a vertical slot 36 in the rear portion of the connecting rod 15. In the position shown in full lines in Fig. 4, the dog rests by gravity against a pin 36′, and when the pedals are moved backwardly as shown by the arrow in Fig. 4 the point 37 of the dog rides in a groove 38 in the bottom of the wagon and engages the end portion 33 of the lever 30 to rock the same about its pivot and apply the brake. When the pedals are moved in the opposite direction, that is, in a direction to drive the wagon forwardly, the pawl 34, of course, is drawn rearwardly and downwardly over the lever 33, swinging upwardly about its pivot 35 when passing the lever. If it is desired to use the pedals for driving the wagon backwardly, the dog 34 may be swung upwardly about its pivot to the position shown in dotted lines in Fig. 4, where it rests upon a pin 39 and is inoperative.

Other means may be substituted for the connecting rod 15 to hold the crank shafts 2 and 12 in the same relative position. For instance, each shaft may be provided with a sprocket wheel 40, as shown in Fig. 10, the sprocket wheels being connected by a chain 41. An obvious modification of the construction shown would be to make the shaft or axle 2 an intermediate drive shaft and connect it to the rear axle by gearing.

When propelling the wagon by means of the pedals 11, the operator will usually stand upright using the handle 9 both as a means of supporting himself erect and for guiding the vehicle. In descending a grade, the ratchet mechanism, when in the position shown in Fig. 7, permits the vehicle to coast without moving the pedals 11 or the crank shafts. The body of the wagon may, of course, be made of sufficient length to carry any number of people, while the one in front guides the wagon.

When using the vehicle for hauling, the ratchet mechanism still remains in the position shown in Fig. 7, while the handle 9 is used for drawing the vehicle forwardly, the same being lowered about the pivot 8ª to the position shown in dotted lines in Figs. 1 and 2. It will be noted that the pivoted ends of the column 8 and handle 9 are in the form of yokes 42 and 43, whereby to strengthen the same against lateral stress and are provided with cooperating brackets 44 and 45 which may be locked together by a bolt and nut 46 or similar locking means when the handle is used for steering.

If it be desired to propel the wagon both forwardly and backwardly by means of the pedals, the cam 23 is thrown to the position shown in Fig. 6, and the rear wheels are then locked to the axle so that they move therewith in either direction.

The brake actuating mechanism may be rendered operative or inoperative depending upon the position of the dog 34. This dog will, of course, always be swung to the inoperative position, as shown in dotted lines in Fig. 4, whenever the ratchet mechanism is locked as shown in Fig. 6.

From the foregoing description, it will be understood that I have provided a wagon which will answer all the purposes of a coaster wagon, and which may at the same time be propelled over level ground by means of the pedals. The wagon also, in addition to being used as a source of amusement, may be used in the same manner as an ordinary express wagon for hauling articles from one place to another. The bottom of the body is solid or imperforate. The throw of the cranks is such that they are maintained within the confines of the body, and do not touch the bottom.

It will also be understood that the detailed structure shown and described is for the purpose of illustrating one means by which the invention may be carried out, and that various modifications may be made therein within the scope of what is claimed without departing from the spirit of the invention.

What is claimed:—

1. In a foot propelled child's vehicle, a pair of crank shafts, one of which has a driving connection with the vehicle, a pair of pedals journaled on the cranks of the respective shafts and operable to rotate the shafts, and means making it impossible for the shafts to rotate in opposite directions.

2. In a foot propelled child's vehicle, a pair of shafts, one of which has a driving connection with the vehicle, each shaft having a pair of oppositely-disposed cranks, and a third crank obliquely disposed with reference to the other two cranks, pedals connecting corresponding ones of the oppositely-disposed cranks and operable to rotate the shafts, and a connecting rod connecting the obliquely-disposed cranks to maintain the shafts always in the same relative angular position.

3. In a foot propelled child's vehicle, a driving axle having a pair of oppositely-disposed cranks, pedals journaled at one end on the cranks, an idle shaft with similarly disposed cranks supporting the other ends of the pedals, and means making it impossible for said shaft and axle to rotate in opposite directions.

4. In a foot propelled child's vehicle, a driving axle having a pair of oppositely disposed cranks, pedals journaled at one end on the cranks, a shaft with similarly disposed cranks supporting the other ends of the pedals, said shaft and axle each having a third crank obliquely disposed with reference to the other two cranks, said obliquely disposed cranks extending in the same directions from the shaft and axle respectively, and a connecting rod connecting the obliquely disposed cranks so as to make it impossible for the crank shaft and axle to rotate in opposite directions.

5. In a foot propelled child's vehicle, a driving crank shaft having a pair of pedals journaled at one end thereon and operable to rotate the same, a driving connection between the crank shaft and vehicle, an idle crank shaft on which the other ends of the pedals are journaled, and means making it impossible for the crank shafts to be rotated in opposite directions.

6. In a foot propelled child's vehicle, a drive shaft having a pair of oppositely-disposed cranks, a pair of pedals supported at one end by the cranks and operable to rotate the crank shaft, means supporting the other ends of the pedals to maintain said pedals always parallel to the surface over which the vehicle travels, and means operable to propel the vehicle upon rotation of the crank shaft in one direction while permitting the vehicle to coast when the rotation of the crank shaft ceases.

7. In a foot propelled child's vehicle, a drive shaft having a pair of oppositely disposed cranks, a pair of pedals supported at one end by the cranks and operable to rotate the crank shaft, means supporting the other ends of the pedals to maintain said pedals always parallel to the surface over which the vehicle travels, means operable to propel the vehicle upon rotation of the crank shaft in one direction while permitting the vehicle to coast when the rotation of the crank shaft ceases, a brake device, and means for applying the brake by backward movement of the pedals.

8. In a foot propelled child's vehicle, a drive shaft having a pair of oppositely-disposed cranks, a pair of pedals supported at one end by the cranks and operable to rotate the crank shaft, means supporting the other ends of the pedals to maintain said pedals always parallel to the surface over which the vehicle travels, means operable to propel the vehicle upon rotation of the crank shaft in one direction while permitting the vehicle to coast when the rotation of the crank shaft ceases, means for applying a brake when the crank shaft is rotated in the opposite direction, and means for shifting the brake-actuating means to render the same inoperative, so that the vehicle may be propelled backwardly by back pedaling.

9. In a foot propelled child's vehicle, a drive shaft having a pair of oppositely-disposed cranks, a pair of pedals supported at one end by the cranks and operable to rotate the crank shaft, means supporting the other ends of the pedals to maintain in the same always parallel to the surface over which the vehicle travels, ratchet mechanism for propelling the vehicle upon rotation of the crank shaft in one direction while permitting the vehicle to coast when the rotation of the crank shaft ceases, and means for locking the ratchet mechanism so as to propel the vehicle in both directions.

10. In a foot propelled child's vehicle, a body having a wheeled axle journaled in the side walls thereof and provided within the body with oppositely-disposed cranks, a pair of pedals supported at one end by the cranks and operable to rotate the axle, means supporting the other ends of the pedals to maintain the same always parallel to the surface over which the vehicle travels, means operable to propel the vehicle upon rotation of the axle in one direction, while permitting the vehicle to coast when the rotation of the axle ceases, and means connected with said axle for applying a brake to the periphery of one of the wheels when said axle is rotated in the opposite direction.

11. In a foot propelled child's vehicle, a drive shaft having a ratchet connection for driving the vehicle forwardly but permitting it to coast when the rotation of the shaft ceases, said shaft having a pair of oppositely-disposed cranks, pedals operatively connected to the cranks, and a third crank having means connected therewith for applying a brake when the shaft is rotated in a reverse direction.

12. In a foot propelled child's vehicle, a drive shaft having a ratchet connection for driving the vehicle forwardly but permitting it to coast when the rotation of the shaft ceases, said shaft having a pair of oppositely-disposed cranks, pedals operatively connected to the cranks, a third crank having means connected therewith for applying a brake when the shaft is rotated in a reverse direction, means for locking the shaft to the wheels, and means for rendering the brake-actuating means inoperative.

13. In a foot propelled child's vehicle, a drive shaft having a pair of oppositely-disposed cranks, means connected with the cranks for operating the same to rotate the shaft in one direction to propel the vehicle forwardly, said shaft having a third crank, and means operable by the third crank for applying a brake to one of the wheels when the shaft is rotated in a reverse direction.

14. In a foot propelled child's vehicle, a drive shaft having a pair of oppositely-disposed cranks, means connected with the cranks for operating the same to rotate the shaft in one direction to propel the vehicle forwardly, a brake for one of the wheels, a lever operable to apply the brake, and means connected with the shaft and operable by rotation thereof in a reverse direction to engage the lever to actuate the same but riding over the lever without actuating it when the shaft rotates forwardly.

15. In a foot propelled child's vehicle, a wheeled driving axle having a pair of oppositely-disposed cranks, pedals connected at one end with the cranks for operating the same to rotate the axle in one direction to propel the vehicle forwardly, a shaft having similarly disposed cranks for supporting the other ends of the pedals, said shaft and axle each having a third obliquely disposed crank, a connecting rod connecting the obliquely disposed cranks to maintain the shaft and axle always in the same relative position, a brake for one of the wheels, a lever for actuating said brake, and a pivoted dog on said connecting rod and operable upon operation of said pedals and axle in a reverse direction to engage and actuate the lever to apply the brake but riding over said lever without actuating it when the axle rotates forwardly.

16. In a foot propelled child's vehicle, a wheel-supported rectangular body having side and end walls and an imperforate bottom, a pair of shafts journaled in the side walls of the body and each having a pair of oppositely-disposed cranks within the body, a pair of pedals connecting the cranks of the respective shafts, and a driving connection between one of the wheels and one of the shafts, the throw of the cranks being such that they are always within the confines of the body.

17. In a foot propelled child's vehicle, a wheel-supported rectangular body having side and end walls and an imperforate bottom, a shaft journaled in the side walls of the body and normally having an operative connection with one of the wheels to propel the vehicle, said shaft being provided within the body with a pair of oppositely-disposed cranks, pedals connected with the cranks and operable to rotate the shaft, means for rendering the connection between the crank shaft and wheel inoperative while the body is used for hauling loads, and means for drawing the vehicle when so used while the shaft and pedals remain stationary.

18. In a foot propelled child's vehicle, a wheel-supported rectangular body including a bottom with sides and ends, a pair of shafts journaled in the side walls of the body and each having a pair of oppositely-disposed cranks within the body and operating above the bottom thereof, the throw of the cranks being such that they are always within the confines of the body, a pair of pedals connecting the cranks of the respective shafts, a driving connection between one of the wheels of one of the shafts, a steering means for the front wheels, a combined steering handle and tongue connected to the steering means, and means provided on the steering handle and tongue to either maintain it in an upright position for steering the vehicle or in a lowered position to serve as a tongue therefor.

19. In a foot-propelled child's vehicle, a rear shaft provided with two oppositely-disposed cranks, a front shaft provided with two oppositely disposed cranks, a pair of long pedals spaced apart and journaled on the cranks of the said shafts and connecting the same, the cranks of one shaft being arranged parallel to and at equal distances from the cranks of the other shaft, each of said shafts being provided with an intermediate crank portion disposed at an angle to the other cranks, and means for connecting the two shafts between the pedals so as to hold the shafts in the same relative position to each other, whereby the pedals are always supported parallel to the ground.

In testimony that I claim the foregoing as my own, I have hereto affixed my signature.

WALTER ROGERS BENJAMIN.